United States Patent [19]

Rice

[11] Patent Number: 5,234,346
[45] Date of Patent: Aug. 10, 1993

[54] EDUCATIONAL AND TRAINING SIMULATOR SYSTEM AND METHOD

[76] Inventor: James W. Rice, 8880 Telephone Rd., Houston, Tex. 77061

[21] Appl. No.: 649,450

[22] Filed: Feb. 1, 1991

[51] Int. Cl.$^5$ .............................................. G09B 5/00
[52] U.S. Cl. ..................................... 434/316; 434/44; 434/308; 358/88
[58] Field of Search ................... 434/29, 38, 43, 44, 434/62, 69, 236, 307, 308, 314, 316, 365; 358/32, 88, 92; 359/174, 250, 577; 354/270

[56] References Cited

U.S. PATENT DOCUMENTS

| | | | |
|---|---|---|---|
| 3,291,904 | 12/1966 | Ratliff, Jr. ............................... | 358/88 |
| 3,557,470 | 1/1971 | Emerick et al. ........................ | 434/44 |
| 3,949,490 | 4/1976 | Derderian et al. ..................... | 434/44 |
| 4,125,843 | 11/1978 | Whitby ................................... | 346/17 |
| 4,657,512 | 4/1987 | Mecklenborg ......................... | 434/44 |
| 4,951,151 | 8/1990 | Sorenson et al. ................. | 434/150 X |
| 4,966,436 | 10/1990 | Wayhew et al. .................. | 358/88 X |
| 5,049,987 | 9/1991 | Hoppenstein ......................... | 358/88 |

*Primary Examiner*—Richard J. Apley
*Assistant Examiner*—Joe H. Cheng
*Attorney, Agent, or Firm*—Arnold, White & Durkee

[57] ABSTRACT

An educational and training simulator system for use in classrooms, having two or more sets of visual projectors, each angularly shifted so that it is polarized and a three dimensional image may be viewed that appears to float forward of the screen plane A playback device delivers a pre-recorded clock and cue signal to control the sequence of visual projectors, and simultaneously controls audio output and other special effects output that are desired.

12 Claims, 2 Drawing Sheets

EDUCATIONAL AND TRAINING SIMULATOR SYSTEM AND METHOD

BACKGROUND OF THE INVENTION

The present invention relates to the application of an educational and training simulator system for use in classrooms and large groups. More particularly, the invention involves an educational and training simulator system having simultaneous control of audio, video, and special effects generators. The present invention uses special effects techniques for light, sound, smell, vibration, and optics to produce simulated "virtual reality" for a large group of viewers at the same time.

Flight simulators typically include a display system in which video images are projected to a screen or window for viewing by an individual observer or pair of individuals. U.S. Pat. Nos. 3,557,470 and 3,949,490 show examples of prior art flight simulator systems. These prior art flight simulators have not been adapted for classroom applications. While the prior art systems provide video output, they do not provide special effects output. Also, these prior art systems are prohibitively expensive for classroom use. Thus, a relatively inexpensive educational and training simulator system is needed to provide visual, audio, and special effects output for a large group of people for training purposes.

SUMMARY OF THE INVENTION

The general object of the present invention is to provide a realistic simulation system for educational and training purposes, for application across all levels of education.

Another object of the present invention is to provide a realistic experience for educational and training use in the classroom thereby improving individual retention and learning.

Yet another object of the present invention is to provide a relatively inexpensive educational and training simulator system for training in the classroom.

The objects of the invention and other objects which will become apparent as the description proceeds are achieved in an educational and training simulator system for simultaneously controlling multiple sets of visual (still or video) projectors for projecting visual images, with each visual projection being polarized so the resulting image appears to be three dimensional. The stereoscopic image being projected appears to float in front of the screen rather than on the screen plane.

The present invention involves a controller for each of the sets of visual projectors, a playback device for simultaneously delivering a pre-recorded first signal to the controllers and one or more special effects devices, and a second signal for audio output.

DETAILED DESCRIPTION OF A PREFERRED EMBODIMENT

Figure 1:
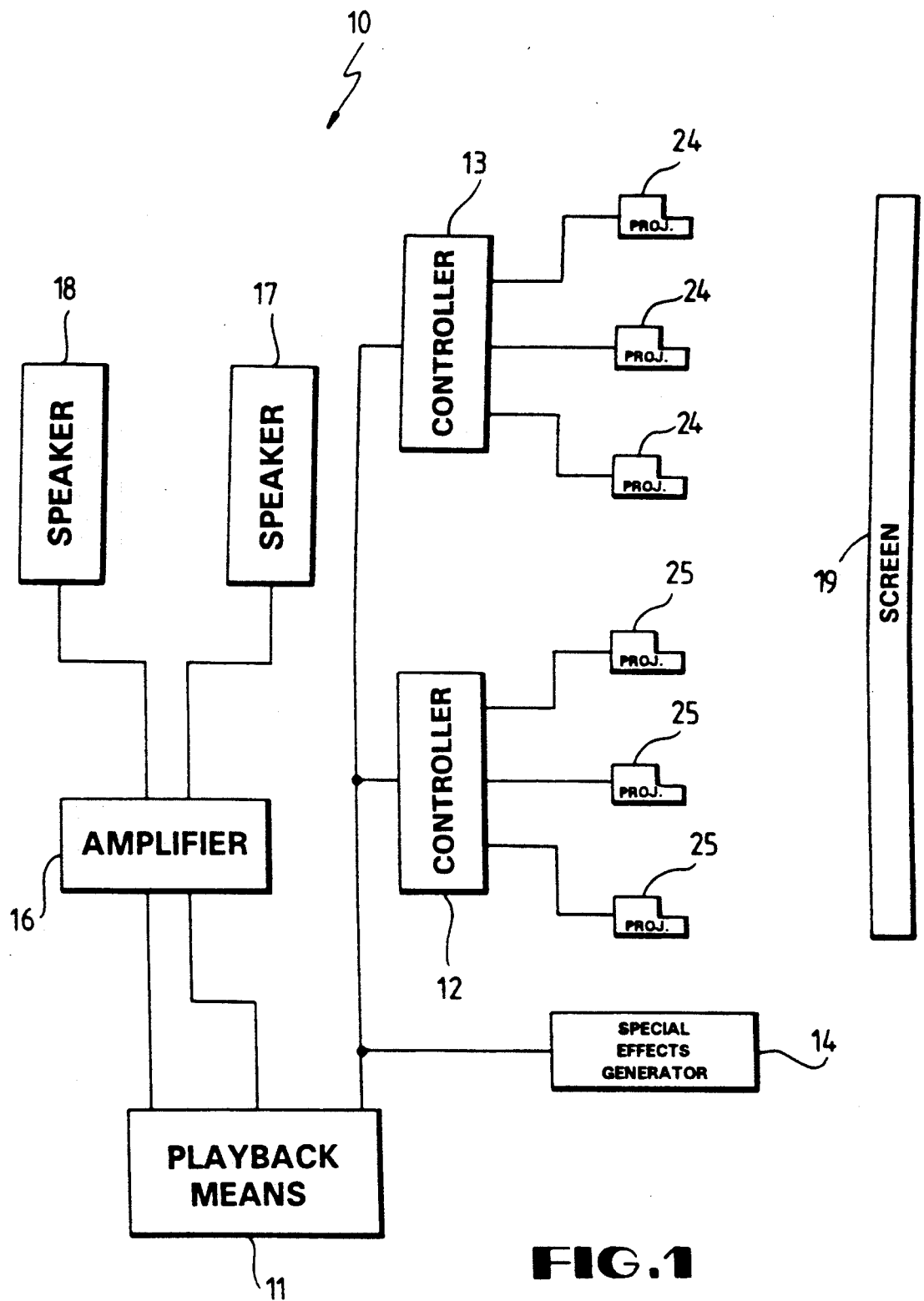
FIG. 1 is a block diagram of the educational and training simulator system incorporating the invention.

FIG. 1 is a block diagram of an educational and training simulator system according to a preferred embodiment of the present invention. The system includes playback means 11 which plays a pre-recorded sequence of clock and cue signals on a tape, disc, or other medium. The playback means 11 delivers the first clock and cue signals to a first controller 12 and a second controller 13. Controller 12 controls the first set of visual projectors 25, while controller 13 controls the second set of visual projectors 24. The controllers 12, 13 are adapted for automatically sequencing the visual projectors.

The visual projectors may be slide projectors, motion picture projectors, or video projectors. The lens of each projector is polarized so that the resulting projection shows what appears to be three dimensional images. This is commonly referred to as V-polarization, where the left projector has the polarizing material placed over the lens shifted minus 22.5° from the vertical axis and the right projector has it shifted plus 22.5°. Thus, the combination of shifts equal 45°.

When slide projections are used, controllers 12, 13 sequence the projectors 24, 25 based on a clock and cue signal received from playback means 11. The clock signal is a series of timing pulses delivered to all of the output devices to provide markers for programs and commands. The cue signal provides a command to controllers 12, 13 to signal the sequence of images.

The system of the present invention is capable of controlling two or more sets of projectors simultaneously with the two controllers 12 and 13. In a preferred embodiment, each set includes three projectors. Also shown in FIG. 1 is a screen 19. With the present invention, rear screen projection or front screen projection may be used.

The controllers utilize the first clock and cue signal to synchronize their operation. The cue and clock information is provided by programmed information received from the playback means 11. The playback means 11 must be capable of playing at least three prerecorded tracks. Preferably, the third track is the clock and cue information, and the first two tracks are audio output. The clock signal is recorded initially on track three and the cue signal is recorded initially onto track four, then tracks three and four are mixed together and recorded onto the third track. The audio output is transmitted to an amplifier 16 and speakers 17 and 18. The clock and Cue signal output also is simultaneously transmitted to one or more special effects generators 14. The special effects generator may be a smoke output, an odor output, mirrors, vibrators, strobe lights, lasers, or some other special effect device.

Figure 2:
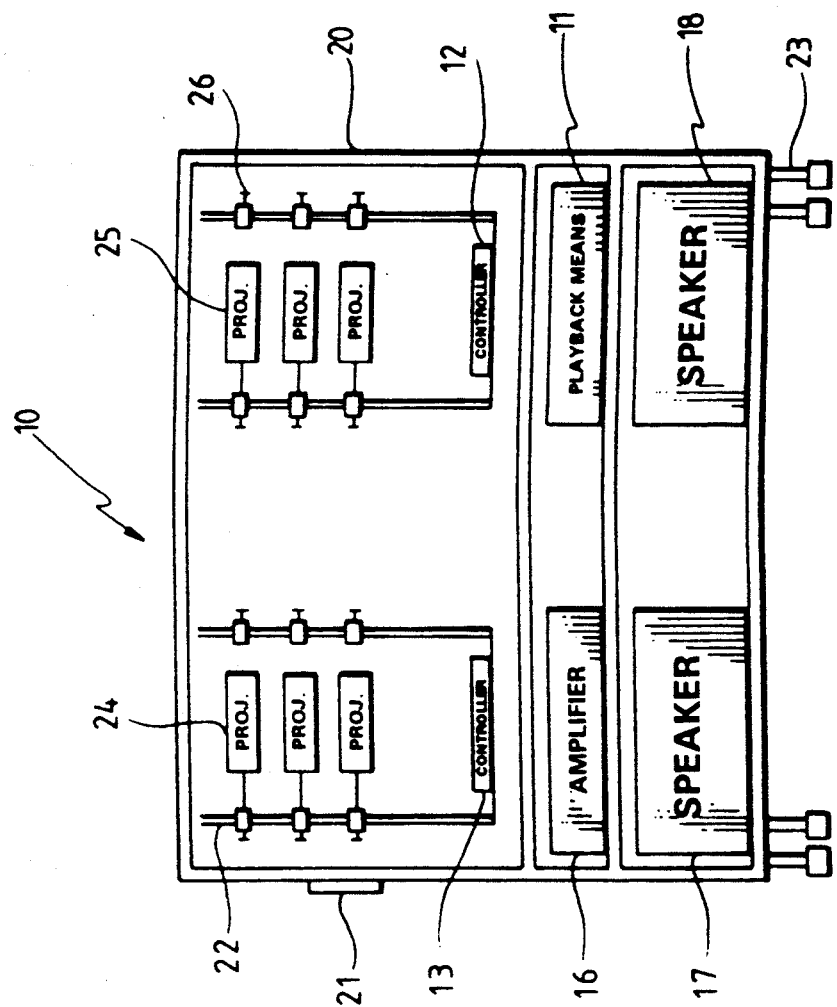
FIG. 2 is an elevation view of the module incorporating the educational and training simulator system of the present invention.

Now referring to FIG. 2, the educational and training simulator system 10 is shown in module 20. The module provides a portable setup for the educational and training simulator system. The playback means 11, amplifier 16, and speakers 17 and 18 are positioned in the module. Also shown is a rack system 22 for supporting visual projectors 24, 25 and controllers 12, 13. Each of the rack systems includes adjustment means 26 for individually adjusting each of the projectors 24, 25. The module 20 also includes rollers 23 or other supports for portability, and a control panel 21 for operating the playback means.

With the present invention, video, audio, and other special effects may be simultaneously controlled for use in the classroom for educational and training purposes. The invention also includes detecting means (not shown in the drawing) for detecting motion and/or temperature and activating the playback means when the desired motion and/or temperature conditions are satisfied. This may be used to start the simulation or training session. Also not depicted is an infra red detector for remote control capability.

Thus, the present invention provides a relatively inexpensive simulation technique that is particularly useful for classroom training.

Although variations in the embodiment of the present invention may not each realize all of the advantages of the invention, certain features may become more important than others in various applications of the device. The invention, accordingly, should be understood to be limited only by the scope of the appended claims.

I claim:

1. An educational and training simulator system comprising:
   (a) a playback means for simultaneously playing a first clock and cue signal and a second audio signal;
   (b) a plurality of a first visual projection means for projecting visual images on a first axis angularly shifted from the vertical axis;
   (c) a plurality of second visual projection means for projecting visual images on a second axial angularly shifted from the vertical axis;
   (d) first control means adapted to selectively activate each of the first visual projection means in a desired sequence in response to the first clock and cue signal received from the playback means;
   (e) second control means adapted to selectively activate each of the second visual projection means in a desired sequence in response to the first clock and cue signal received from the playback means;
   wherein the first and second visual projection means cooperate to project a stereoscopic image that appears to float in front of a screen; and
   (f) audio output means for providing audio output in response to the second audio signal received from the playback means.

2. The educational and training simulator system of claim 1 wherein the visual images projected from the plurality of first and second visual projection means are polarized by shifting the first axis minus 22.5 degrees from the vertical axis and the second axis plus 22.5 degrees from the vertical axis.

3. The educational and training simulator system of claim 1 further comprising at least one special effects generator for generating special effects output responsive to the first clock and cue signal received from the playback means.

4. The educational and training simulator system of claim 3 wherein the special effects generator is a smoke generator.

5. The educational and training simulator system of claim 3 wherein the special effects generator is an odor generator.

6. The educational and training simulator system of claim 1 wherein the first clock and cue signal comprises a clock signal having a series of timing pulses and a cue signal for signalling the change of video images.

7. The educational and training simulator system of claim 1 wherein the audio output means comprises an audio amplifier which amplifies the second audio signal and outputs the second audio signal to a plurality of audio speakers.

8. The educational and training simulator system of claim 7 wherein the second audio signal comprises a plurality of audio signals, each delivered to a separate audio speaker.

9. The educational and training simulator system of claim 1 further comprising detecting means for detecting motion and activating the playback means when desired motion conditions are satisfied.

10. The educational and training simulator system of claim 1 further comprising detecting means for detecting temperature and activating the playback means when desired temperature conditions are satisfied.

11. The educational and training simulator system of claim 1 further comprising a portable module having an adjustable support for each of the first and the second visual projection means.

12. A method for training and educating a group of persons using an educational and training simulator system having a pair of controllers, at least one special effects device, at least two visual projectors, a screen and at least one audio output device, wherein said method comprising:
   (a) delivering a pre-recorded first signal to a pair of controllers and to at least one special effects device, each of said controllers connected to at least one visual projector;
   (b) delivering a pre-recorded second signal to at least one audio output device;
   (c) projecting a pair of polarized visual images in response to the controllers to provide three dimensional images that appears to float in front of a screen to a group of persons; and
   (d) producing at least one special effect to said group of persons.

* * * * *

UNITED STATES PATENT AND TRADEMARK OFFICE
CERTIFICATE OF CORRECTION

PATENT NO. : 5,234,346
DATED : August 10, 1993
INVENTOR(S) : James W. Rice

It is certified that error appears in the above-indentified patent and that said Letters Patent is hereby corrected as shown below:

Column 3, line 23, the word "axial" should read --axis--

Signed and Sealed this

Twelfth Day of April, 1994

Attest:

BRUCE LEHMAN

*Attesting Officer*         *Commissioner of Patents and Trademarks*